United States Patent [19]
Verrill et al.

[11] Patent Number: 5,938,800
[45] Date of Patent: Aug. 17, 1999

[54] COMPACT MULTI-FUEL STEAM REFORMER

[75] Inventors: Christopher L. Verrill, Jackson Township, Stark County; Larry J. Chaney, Canton; Kurt E. Kneidel, Alliance; Robert A. McIlroy, Marlboro Township, Stark County; Robert M. Privette, North Canton, all of Ohio

[73] Assignee: McDermott Technology, Inc., New Orleans, La.

[21] Appl. No.: 08/969,824

[22] Filed: Nov. 13, 1997

[51] Int. Cl.$^6$ ........................................................ B01J 8/16
[52] U.S. Cl. ........................ 48/127.9; 48/118.5; 422/211
[58] Field of Search ........................ 422/211; 48/DIG. 5, 48/127.9, 118.5

[56] References Cited

U.S. PATENT DOCUMENTS

| | | | |
|---|---|---|---|
| 5,207,185 | 5/1993 | Greiner et al. | 123/3 |
| 5,299,536 | 4/1994 | Moard et al. | 123/3 |
| 5,437,123 | 8/1995 | Greiner et al. | 48/107 |
| 5,441,546 | 8/1995 | Moard et al. | 48/107 |
| 5,525,322 | 6/1996 | Willms | 423/653 |
| 5,546,701 | 8/1996 | Grenier et al. | 48/108 |

OTHER PUBLICATIONS

Piwetz et al. "Hydrodesulfurization and Prereforming of Logistic Fuels for Use in Fuel Cell Applications", presented at the 1996 Fuel Cell Seminar held Nov. 17–20, 1996 in Orlando, FL., pp. 780–783.

Privette et al. "Status of SOFCo SOFC Technology Development", presented at the 1996 Fuel Cell Seminar held Nov. 17–20, 1996 in Orlando, FL., pp. 206–209.

*Primary Examiner*—Timothy McMahon
*Attorney, Agent, or Firm*—R.J. Edwards; Eric Marich

[57] ABSTRACT

A compact, mobile fuel converter for producing molecular hydrogen from hydrocarbon fuels, such as automotive gasoline, or other fuels such as methanol and ethanol has a steam reformer for producing molecular hydrogen from a pressurized and desulfurized fuel and water vapor preheated by flue gases from the fuel processor. The fuel processor is fed with the desulfurized fuel and water mix and a burner is provided to combust off-gas from the fuel processor reaction. Uncombusted off-gas is depressurized and mixed with auxiliary fuel used in the burner. Hydrogen produced in the fuel processor by the steam reforming process is separated from other reformate products using membrane filtration.

30 Claims, 4 Drawing Sheets

Compact Fuel Processor

COMPACT MULTI-FUEL STEAM REFORMER

FIELD OF THE INVENTION

The present invention relates generally to the field of hydrocarbon fuel conversion and, in particular, to a new and useful system for producing molecular hydrogen ($H_2$) from a hydrocarbon fuel. The system employs a compact, multi-fuel, steam reformer or fuel processor apparatus which uses a hydrogen permeable separator membrane filter to separate the hydrogen ($H_2$) from a mixture of the hydrocarbon fuel and steam. The high purity hydrogen ($H_2$) produced by the system is particularly suitable for use as the source fuel for fuel cells used to produce electricity.

BACKGROUND OF THE INVENTION

The conversion of the common hydrocarbon transportation fuels, such as gasoline, into a hydrogen-rich gas suitable for use in fuel cell systems used to produce electricity has yet to be demonstrated in a practical system. The hydrocarbon processing industry has developed technologies for converting low-value feedstocks to hydrogen and synthesis gas. Common approaches include steam reforming, partial oxidation, and autothermal reforming.

Steam reforming systems are used in over 90% of industrial hydrogen and synthesis gas plants. Feedstock and steam are reacted in heated tubes filled with catalysts (typically nickel based) to convert the hydrocarbons into principally hydrogen and carbon monoxide. Due to the endothermic nature of steam reforming, it is uniquely suited to integration with sources of available high-grade waste heat in many industrial applications. In addition to its high conversion efficiency, steam reforming avoids dilution by nitrogen which is inherent in partial oxidation and autothermal reforming systems. Such diluent gases increase the mass flows and thereby increase the size and cost of necessary equipment. While steam reforming has many desirable benefits, it is adversely affected by sulfur content in the feedstock. Land-based systems thus commonly employ a hydrogenation process followed by sulfur absorption to remove the sulfur prior to steam reforming. Sulfur removal and thermal integration are thus two critical issues facing the use and adaptation of steam reforming processes into a compact, on board fuel processing system for vehicles such as automobiles.

Partial oxidation systems are based on substoichiometric combustion to achieve the temperatures necessary to reform the hydrocarbon feedstock. Decomposition of the feedstock to primarily hydrogen and carbon monoxide occurs through thermal cracking reactions at high temperatures (2200–3000° F.). The heat required to drive the reactions is supplied by burning a fraction of the fuel; therefore, the efficiency of such systems is limited by the amount of fuel burned. In addition, because air is commonly used as the oxidant in small systems, significant quantities of diluent nitrogen must be accommodated, thereby increasing the size of the processing equipment.

Catalysts have been used with partial oxidation systems (catalytic partial oxidation) to promote conversion of various sulfur-free feedstocks, such as ethanol, into synthesis gas. The use of a catalyst can result in acceleration of the reforming reactions and can provide this effect at lower reaction temperatures than those which would otherwise be required in the absence of a catalyst. The desirable result can be soot-free operation, which is a common problem with partial oxidation approaches, and improved conversion efficiency from smaller and lighter weight equipment. However, common catalysts are susceptible to coking by feedstocks which are high in aromatic content (such as automotive fuels) at the low steam-to-carbon ratios employed (typically 0 to 1 mole of $H_2O$ per mole of carbon in the feedstock).

Autothermal reforming (ATR) is a variation on catalytic partial oxidation in which increased quantities of steam are used to promote steam reforming and reduce coke formation. A significant advantage of ATR technology is direct thermal integration of the heat source (partial combustion) and the catalyst bed. This considerably simplifies start-up procedures and reduces transients for load-changes. The high temperature of the ATR catalyst bed (1800–2200° F.) imparts considerable sulfur tolerance, which is desirable for sulfur-bearing automotive fuels. However, ATR requires either air compression with associated nitrogen dilution of product gas or an on-board source of oxygen, both of which add size and cost to the fuel processing system.

Although none of the fuel processing technologies described above have been demonstrated in a suitably compact, lightweight, and cost-effective configuration for transportation applications, such as their use in electric cars, steam reforming has several unique advantages over the other approaches. Steam reforming does not require oxidation of the fuel, and thus it offers the potential for superior energy efficiency and reduced size compared to either partial oxidation or autothermal reforming.

In addition to the fuel processing step, other processing steps may be necessary to reduce the $H_2S$ and CO content of the fuel gas to meet fuel cell requirements. Absorbent beds can be utilized to remove $H_2S$ from the fuel gas. Catalytic systems are used industrially to promote conversion of CO and $H_2O$ to $H_2$ and $CO_2$ by the water-gas shift reaction or to selectively burn CO to $CO_2$. However, each of these processes requires a heat exchanger to control gas temperature, each adds size and weight to the complete fuel processing system, and control can be complex-especially during conditions of varying flow rates.

One alternative to catalytic gas processing is to employ a hydrogen-permeable membrane material to separate essentially pure hydrogen from the remainder of the fuel gas. Typically, these membranes are made from palladium or palladium alloy films supported by porous ceramic substrates. The palladium has high selectivity as well as high permeability for hydrogen. The thermal limits of such membrane materials and their tolerance to poisoning by sulfur and carbon deposits remain to be demonstrated under real-world fuel processing conditions. The high cost of palladium is also an issue for vehicular systems; however, intensive research is being conducted to reduce the required thickness of the film, which will reduce the amount of palladium needed for a given membrane.

Laboratory testing of membrane-walled reactors for steam reforming natural gas has been reported in the literature, but the present inventors are unaware of any application of this technology to on-board, mobile, fuel processing systems.

It is estimated that there are approximately 675 million or more motor vehicles in use worldwide. Almost all of these vehicles currently use internal combustion engines for motive power. Many attempts to produce a cost effective, yet powerful electric car have been made in recent years.

Fuel cells, which use molecular hydrogen ($H_2$) gas to produce electricity, are known as an efficient electrical power source. Fuel cells are quieter and cleaner than internal combustion engines. However, providing a continuous flow of nearly pure hydrogen to power such fuel cells has made producing an electric car operating on these devices difficult at best. Several considerations must be made when designing a fuel cell powered system that is capable of economically and efficiently competing with the internal combustion engine as a primary motive power source, and these include adequate reliability, size, weight, and cost. The subject invention addresses each of these important considerations.

SUMMARY OF THE INVENTION

Until now, the efficient integration of fuel-feed desulfurization, a steam reforming catalyst bed with a hydrogen-separation membrane, and an off-gas burner in a compact reactor design has not been available. It is thus an object of the present invention to provide a relatively compact, mobile, system and apparatus which can produce high purity hydrogen ($H_2$) from automotive gasoline as well as from methanol, ethanol, and other hydrocarbon fuels. The hydrogen ($H_2$) produced is particularly suitable for use as a source fuel in fuel cells for producing electricity.

Accordingly, one aspect of the present invention is drawn to a new and useful system for producing hydrogen ($H_2$) from a hydrocarbon fuel. The system employs a compact, multi-fuel, steam reformer or fuel processor apparatus which generates and separates the molecular hydrogen from a mixture of the hydrocarbon fuel and steam. More particularly, the compact, multi-fuel steam reformer or fuel processor produces the hydrogen ($H_2$) from a pressurized and desulfurized fuel and water vapor preheated by flue gases from the fuel processor. The fuel processor is fed with the desulfurized fuel and water mix and a burner is provided to combust off-gas from the fuel processor reaction. Uncombusted off-gas is depressurized and mixed with auxiliary fuel used in the burner.

Hydrogen is produced in the fuel processor by a steam reforming process using membrane filtration to separate molecular hydrogen ($H_2$) produced from other products of the reaction. The gas and water mix is passed through a catalyst-filled section of the processor, where the hydrogen is generated, passed through the filtration membrane, and collected. The off-gases are combusted by the burner and the flue gases generated are passed back adjacent the catalyst to pre-heat the fuel and water vapor mixture. Uncombusted off-gases are sent to the burner.

The separated hydrogen is cooled by heat transfer with external, colder, burner air and the colder burner air is thus preheated before combustion in the burner. The cooled hydrogen, which is free of most impurities, can then be passed to fuel cells to generate electricity.

The fuel processor of the invention is a compact device which can be fitted in a standard motor vehicle. It can operate on automotive gasoline or other hydrocarbon fuel and water to provide the hydrogen to power fuel cells, thereby replacing conventional internal combustion engines with cleaner and more efficient electrical power. The exhaust gases and burner gases produced by the steam reformer are cleaner and the steam reforming system is quieter than conventional combustion engines.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
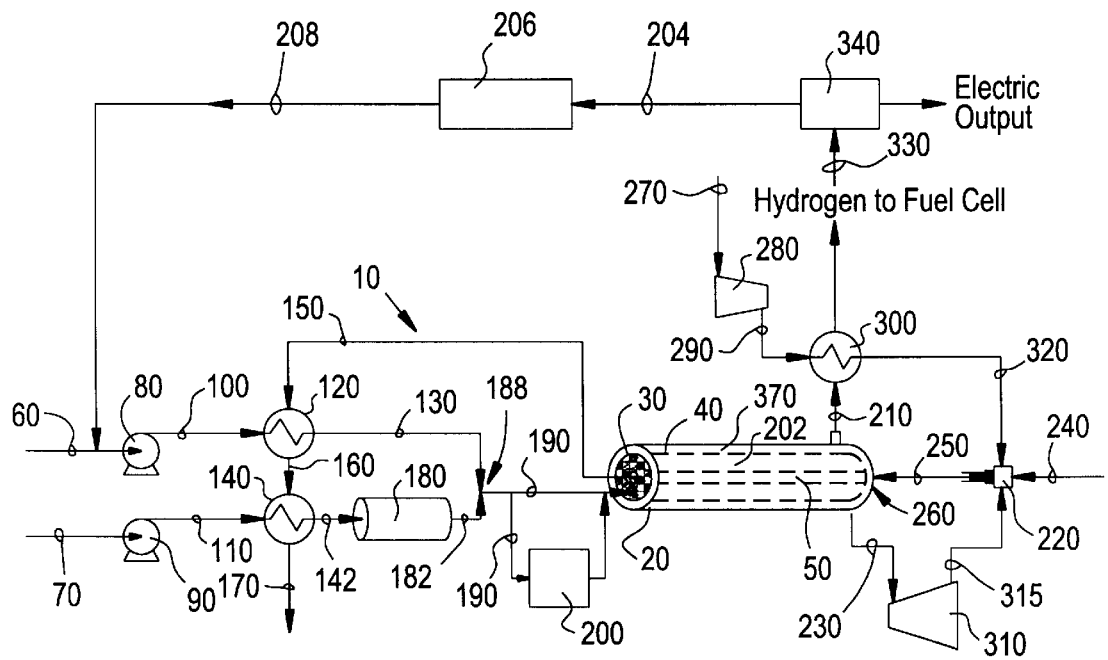
FIG. 1 is a schematic diagram of a fuel conversion system for producing molecular hydrogen ($H_2$) from a hydrocarbon fuel according to the present invention.

Referring now to the drawings, in which like reference numerals are used to refer to the same or similar elements, FIG. 1 schematically shows the relationships between the components of a fuel conversion system, generally designated 10, for producing hydrogen ($H_2$) from a hydrocarbon fuel. In practice, the actual design of system 10 will integrate all of the components into a single, compact, and easily serviceable package. For clarity purposes, however, the individual system 10 components are separated in the FIG. 1 schematic. A compact, multi-fuel steam reformer or compact fuel processor 20 is the central component of system 10, and the compact fuel processor 20 is interconnected with the rest of the elements comprising system 10 as shown. The fuel processor 20 is advantageously of a counterflow design and includes a catalyst bed 30 surrounded by a hydrogen permeable separation membrane filter 40. A flue gas passage 50 is located through the center of the catalyst bed 30.

Water 60 and fuel 70 are supplied through pumps 80, 90, respectively. Pressurized water 100 is pre-heated in a vaporizer 120 by interaction with hot flue gases 150 (at temperatures of about 1300° F.) exiting from the compact fuel processor 20 to raise steam 130. Pressurized fuel 110 is pre-heated in a fuel vaporizer 140 by interaction with hot flue gases exiting from the water vaporizer 120. In the water vaporizer 120 and fuel vaporizer 140, the pressurized water 100 and fuel 110 receive heat from the flue gases 150, 160, which cools the flue gases to about 330° F., after which the cooled flue gases 170 are exhausted from the system 10.

The vaporized fuel 142 is then provided to a desulfurizer 180 where the sulfur in the fuel 142 is removed. The desulfurizer 180 preferably contains a sulfur sorbent which may be periodically replaced as necessary. The sorbent used in the desulfurizer 180 can be a metal oxide, such as zinc oxide or iron oxide, which is supported on a substrate such as zeolite, zirconia, or activated carbon. A desulfurized, vaporized fuel 182 is thus produced at an outlet of the desulfurizer 180. The steam 130 exiting from the water vaporizer 120 and desulfurized, vaporized fuel 182 are combined at 188 to form a desulfurized, vaporized fuel and steam mixture 190.

Alternatively, the desulfurization process could be performed as a liquid-phase desulfurization, prior to vaporizing the fuel 70 at vaporizer 140. In such a case, the operating temperature of the desulfurizer 180 will be much lower, allowing different (and less expensive) materials to be used.

The materials and sequencing of these processes may thus be arranged to optimize the efficiency and minimize costs as much as possible. For example, activated carbon is particularly suitable for low-temperature desulfurization (at temperatures below approximately 200° F.) and refractory materials are preferable for higher temperature desulfurization (at temperatures up to about 700° F.). If commercial sulfur sorbents are unable to sufficiently remove the sulfur from the fuel mixture compounds to levels suitable for processing it in the compact fuel processor 20 as a desulfurized fuel vapor mixture 190, the desulfurizer 180 may be followed by a sacrificial guard material (schematically indicated at 200 in FIG. 1) made of a material with a high affinity for sulfur compounds, such as nickel oxide. The sacrificial guard material 200 can be either incorporated into the desulfurizer 180, or provided as a separate, removable cartridge which is also capable of periodic replacement as necessary.

Following desulfurization and vaporization, the desulfurized fuel vapor mixture 190 is provided to the steam reforming catalyst bed 30 of the fuel processor 20. The catalyst bed 30 promotes conversion of the mixture 190 to a hydrogen-rich gas according to the following equation:

$$C_nH_m + nH_2O \rightarrow nCO + (n+m/2)H_2 \quad (Eq.\ 1)$$

The equilibrium composition of a product gas or reformate 202 produced by the compact fuel processor 20 is determined by the relative rates of water-gas shift (Eq. 2) and methanation (Eq. 3) reactions at the process conditions, as shown by the following equations:

$$CO + H_2O \leftrightarrows CO_2 + H_2 \quad (Eq.\ 2)$$

$$CO + 3H_2 \leftrightarrows CH_4 + H_2O \quad (Eq.\ 3)$$

It is expected that approximately 2 to approximately 4 moles of steam per mole of carbon in the desulfurized fuel vapor mixture 190 will be required to obtain a high hydrogen yield while maintaining a suitable level of resistance to carbon deposition (coking) in the compact, multifuel steam reformer or fuel processor 20. On board storage of large volumes of water 60 may not be required if a portion of any water vapor 204 exiting any fuel cell stacks 340 associated with the system 10 is condensed, shown schematically at 206, and returned to the fuel conversion system 10 as make-up water 208 provided to the water 60 mixed with the fuel 70.

Steam reforming catalysts which can be used in the catalyst bed 30 commonly include nickel or other Group VIII transition metals supported on alumina or other refractory substrates. Sulfur is a temporary poison to such nickel-based catalysts, but the catalyst activity can be regenerated by removing the source of sulfur. The sulfur tolerance of commercial steam reforming catalysts is dependent on process conditions. However, some degree of sulfur removal must be achieved to protect the palladium material comprising hydrogen permeable separation membrane filter 40. Sulfur-tolerant catalysts are being developed by others at this time and, once they are sufficiently developed, could be used with the invention to allow elimination of the desulfurizer 180.

Typical operating conditions in the catalyst bed 30 are between approximately 1000° F. and approximately 1500° F., and at pressures between approximately 3 and approximately 40 atmospheres. The steam to carbon mole ratio can be as low as 2.0:1, as stated above. For example, if naphtha is used as fuel 70, published data indicate that the hydrogen content of the reformed gas is 70% at 1380° F., 8 atmospheres pressure, and a steam to carbon mole ratio of 3.3:1.

As the hydrogen 210 is formed in the catalyst bed 30, it is transported out through the hydrogen-permeable separation membrane filter 40. An advantage of membrane technology is the ability to separate essentially pure hydrogen 210 from any fuel cell poisons which may also be present, including carbon monoxide and hydrogen sulfide, and from other fuel diluents. The poisons do not pass through the separation membrane 40, which is preferably comprised of a thin palladium film on a ceramic or other suitable substrate. The removal of hydrogen 210 from the reformate thermodynamically favors the production of more hydrogen by the water-gas shift reaction (Eq. 2), thereby increasing the efficiency of hydrogen production from the desulfurized hydrocarbon fuel feed 190.

At the other end of the compact fuel processor 20, a burner 220 is provided to combust off-gases 230 from the reformate 202 produced by the catalyst reactions. The burner 220 is initially fired during startup of the process by auxiliary fuel 240, which may be taken from the same feedstock as fuel 70, or from a separate source. Hot flue gases 250 produced as a result of the combustion process in burner 220 are provided at a flue gas inlet 260 to the compact fuel processor 20, preferably in counterflow with respect to the desulfurized fuel feed 190 entering from the other end of the compact fuel processor 20. Combustion air 270 for burner 220 is first drawn in by fan means 280; pressurized combustion air 290 is then preheated in a hydrogen cooler 300 by heat transfer from the hot hydrogen 210 produced by the compact fuel processor 20. Uncombusted off-gases 230 from the reformate 202 are depressurized by expansion through a turbo expander 310 and the depressurized off-gases 315 are then passed to the burner 220 for mixing with preheated combustion air 320 and the auxiliary fuel 240 to burn and form the hot flue gases 250 provided to the compact fuel processor 20. A small, continuous flow of auxiliary fuel 240 may be required as pilot for the off-gases 315 or to provide sufficient heat input to the compact fuel processor 20. Cooled hydrogen ($H_2$) 330 exits hydrogen cooler 300 for transmittal to fuel cell means 340. The hot flue gases 250 produced by the burner 220 provide heat to drive the reforming process inside the compact fuel processor 20. The burner 220 must be capable of operating with a wide range of fuels 70, 240.

Figure 2:
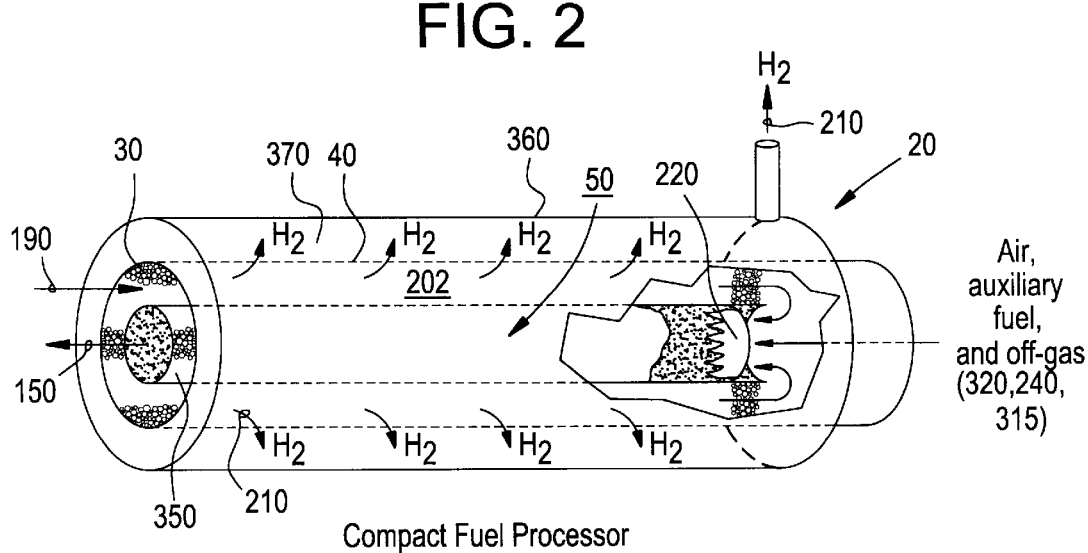
FIG. 2 is a partial sectional perspective view of one embodiment of a compact, tubular, multi-fuel steam reformer or fuel processor apparatus which can be used in the fuel conversion system of FIG. 1.
Figure 4:
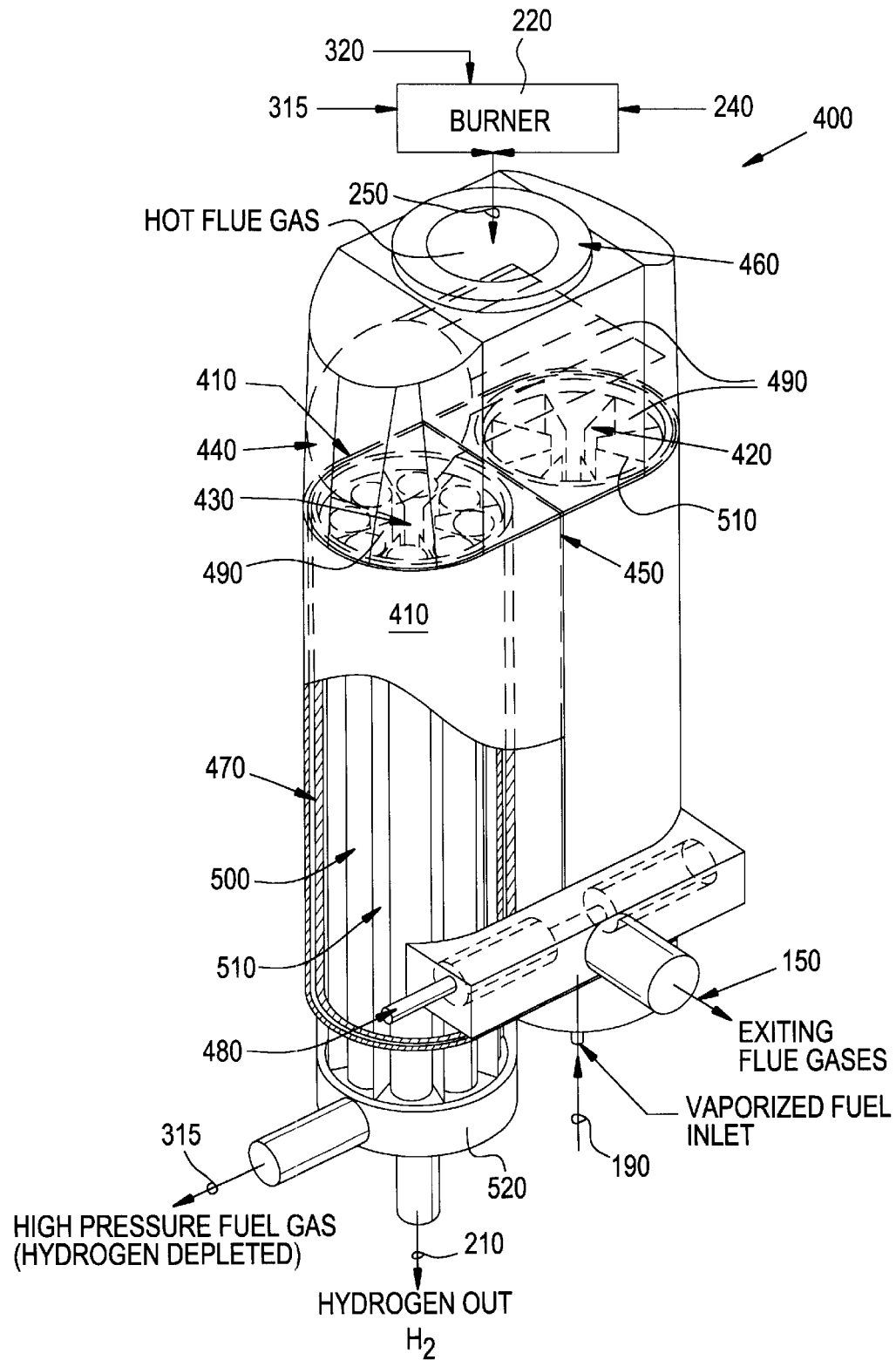
FIG. 4 is a partial sectional perspective view of another embodiment of a compact, U-tube, multi-fuel steam reformer or fuel processor apparatus which can be used in the fuel conversion system of FIG. 1.

FIGS. 2 and 4 show alternate embodiments of the compact fuel processor 20 which can be used with the system 10 according to the invention. In FIG. 2, a first embodiment of the compact fuel processor 20 schematically illustrated in FIG. 1 is shown in greater detail, and advantageously comprises two cylindrical tubes defining, with the hydrogen permeable separation membrane filter 40, three concentric regions: an inner tube 350 defining the inner flue gas passage 50, a surrounding, annular catalyst bed 30, and an outer tube 360 defining outer hydrogen collection annulus 370. The catalyst bed 30 and hydrogen collection annulus 370 are divided by the hydrogen permeable separation membrane filter 40. The tube 350 defines flue gas passage 50 and separates the catalyst bed 30 from the flue gas passage 50. The wall of the tube 350 prevents physical interaction between the flue gases 250 and catalyst bed 30, but allows heat transfer to occur between them. The flue gases 250 are, of course, those generated by the burner 220 positioned at one end of the compact fuel processor 20. As shown in FIG. 1, burner 220 combusts the off-gases 315 originating from the catalyst bed 30, and/or the auxiliary fuel 240, together with combustion air 320.

Figure 3A:
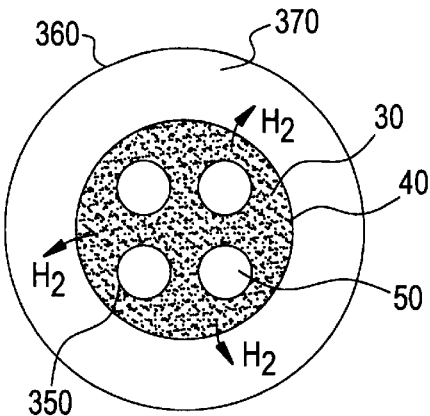
FIGS. 3A–3C are sectional views of various embodiments of the catalyst bed, associated membrane filter and flue gas passages of the invention.
Figure 3B:
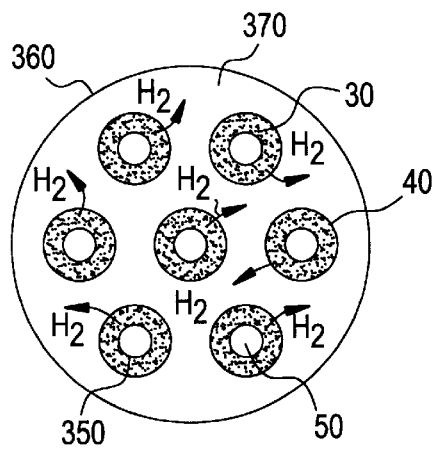
Figure 3C:
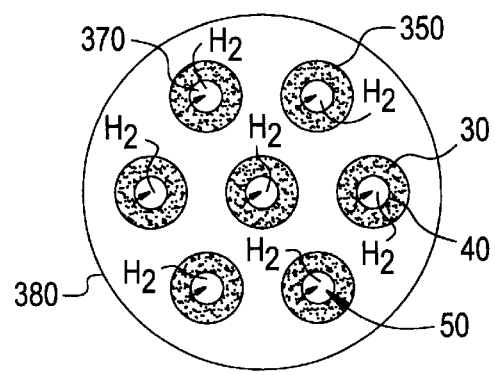

While only a single flue gas passage 50 has been shown in FIG. 2, located inside of the surrounding annular catalyst bed 30, it is understood that there may be more than one flue gas passage 50 located within the catalyst-filled annular bed 30. Similarly, there may be more than one annular catalyst bed 30 located within the tube 360 defining the outer hydrogen collection annulus or region 370. These aspects are schematically illustrated in FIGS. 3A–3B. In FIG. 3A, there is illustrated one embodiment wherein a single catalyst filled bed 30 contains therein plural (in this case four, although fewer or more could be employed) flue gas passages 50. The hydrocarbon feed stock 190 would be provided to the catalyst bed 30 and the heat from the flue gas in passages 50 would serve to reform the hydrocarbon feedstock 190 and drive the hydrogen $H_2$ out across each of the hydrogen permeable separation membrane filters 40 and into the hydrogen collection annulus 370. In FIG. 3B, the plural flue gas passages 50 could each, individually, be provided with its own surrounding catalyst filled bed 30 and membrane filter 40. Again, the hydrocarbon feedstock 190 provided to each of the catalyst filled beds 30 would be heated by the flue gas passing through its associated flue gas passage 50, driving the hydrogen $H_2$ out across each of the hydrogen permeable separation membrane filters 40 and into the hydrogen collection (in this case) area 370. Finally, FIG. 3C illustrates that the relative positions of the flue gas passageway and the hydrogen $H_2$ collection areas could be reversed. In FIG. 3C, a single flue gas passageway 50 is provided, contained within an insulated tube 380 and located therein are a plurality of catalyst filled beds 30 which surround their respective hydrogen permeable separation membrane filters 40. In this case, the heat from the flue gases in passageway 50 is transferred to the outer wall 350 of each of the catalyst beds 30. The hydrogen $H_2$ in the hydrocarbon feedstock 190 is then driven out across the membranes 40 into the individual hydrogen $H_2$ collection passageways 370. Hydrogen $H_2$ is delivered to the exit 210 by an internal manifold (not shown).

Figure 5:
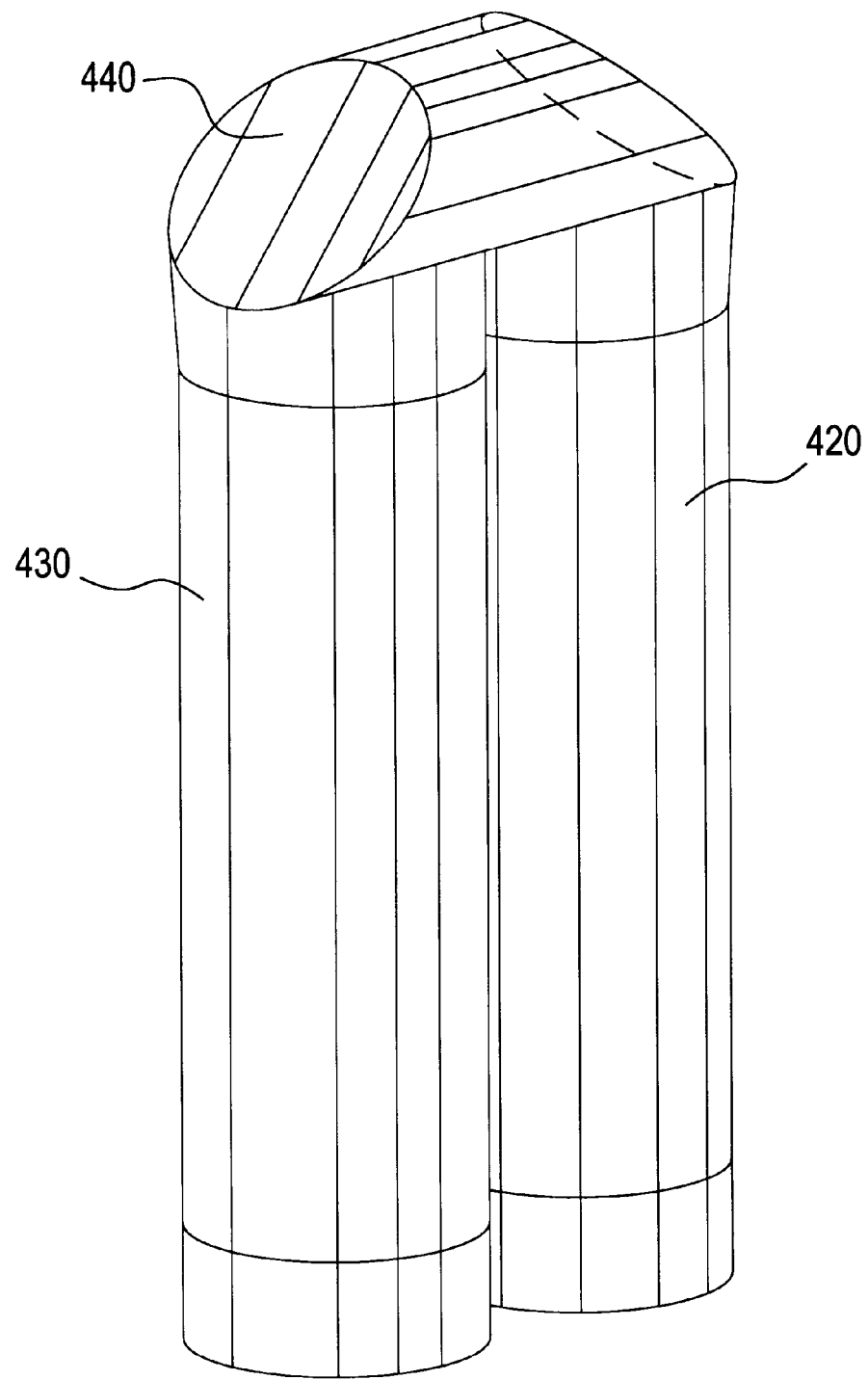
FIG. 5 is an outside, perspective view of a subcomponent of the compact, U-tube, multi-fuel steam reformer or fuel processor apparatus of FIG. 4.

FIG. 4 illustrates a second embodiment of the compact fuel processor 20, this time taking the form of a compact, multi-fuel, U-tube steam reformer or fuel processor, generally designated 400, having an outer casing 410 surrounding a cylindrical steam-fuel reformer 420 and a cylindrical membrane enhanced reformer 430 each connected at one end in a U-shaped configuration by end passage 440. This U-shaped subassembly, with the outer casing 410 removed, is illustrated in FIG. 5. A divider plate 450 separates the reformers 420, 430 in each leg of the U which are inside the outer casing 410. A burner flange 460 is provided through the outer casing 410 adjacent the end passage 440 to allow hot flue gases 250 generated by burner 220 to pass into an annulus 470 formed between the outer casing 410 and the reformers 420, 430 and end passage 440. An adjustable valve or damper 480 is used to control the flow of flue gases 250 over each of the reformers 420, 430 in the U-tube reformer 400. The valve 480 is thereby used to control the heat input to each reformer 420, 430, while the combustion rate of the burner 220 is used to control the total amount of flue gases 250 and heat provided to the Utube reformer 400. Used flue gases 150 exit the U-tube reformer 400 following the valve 480 to pass to the fuel heater 140 (not shown in FIG. 4).

In this embodiment, the desulfurized vaporized fuel/water mixture 190 is provided to the lower end of steam-fuel reformer 420. Steam-fuel reformer 420 is a tube filled with catalyst 490, in which the reactions set out above take place to generate hydrogen containing reformate. The reformate passes out through the end passage 440, which may also contain catalyst 490, to membrane-enhanced reformer 430.

In the embodiment shown, approximately 0.4 ft$^3$ of catalyst 490 could be employed when the steam-fuel reformer 420 is approximately 6" OD and approximately 20" long.

Membrane enhanced reformer 430 has hydrogen permeable membranes 500 for separating hydrogen from the reformate located within the catalyst 490, as well as heat transfer fins 510. Hydrogen 210 separated from the reformate exits the U-tube reformer 400 through a lower end of the membrane-enhanced reformer 430, while off-gases 315 exiting adjacent to the lower end are provided to and depressurized with the turboexpander 310 (not shown in FIG. 4).

The membranes 500 are tubular in shape, with one end closed and the other sealed to a header 520 at the lower end where the low pressure hydrogen $H_2$ 210 exits the reformer 430. The volume outside the membrane tubes 500 has the catalyst 490 to maintain the high-pressure gas mixture at thermodynamic equilibrium. In the embodiment shown, eight such membrane tubes 500 are employed, each approximately 1.25" OD and approximately 20" long, to provide approximately 4.4 ft$^2$ of membrane area.

Different catalyst formulations may be utilized, for example, to promote higher hydrocarbon cracking in the steam-fuel reformer 420 and to minimize methane formation in the membrane enhanced reformer 430.

The invention as disclosed herein can be made in a compact and mobile design while producing useful quantities of hydrogen. In comparison to large industrial plants, the system of the invention is a highly integrated assembly in a light-weight, low-volume package which can be used in an automobile. For example, it is estimated that the overall height of the compact, U-shaped steam reformer or fuel processor 400 of FIG. 4 would be approximately only 30–35" tall, and 12–14" across the legs of the "U". Each of the tubular reformer elements 420, 430 would be approximately 6" OD.

Further, while the invention has been disclosed for processing of hydrocarbon fuels such as automotive gasoline and liquid aviation fuel, it is envisioned that liquid alcohols (such as ethanol or methanol) and compressed hydrocarbon gases (such as natural gas, propane and methane) could also be used with the system if the steam to carbon ratio, operating pressure, and catalyst formulation are altered accordingly. Operation with alcohols has the additional benefit that it would eliminate the need for a desulfurizer, thereby further decreasing the volume and size requirements for installing the system in an automobile.

While a specific embodiment of the invention has been shown and described in detail to illustrate the application of the principles of the invention, it will be understood that the invention may be embodied otherwise without departing from such principles.

We claim:

1. A compact, multi-fuel steam reformer system comprising:

fuel means for supplying a pressurized, vaporized fuel and steam mixture;

a steam reformer having a catalyst bed in communication with the fuel means, and hydrogen filtration means for filtering and removing hydrogen produced in the catalyst bed from the fuel and steam mixture and means for providing same to a collection header; and burner means integrated with the steam reformer for providing hot flue gases to heat the catalyst bed and to make the vaporized fuel and steam mixture by combustion of at least one of an off-gas produced by the steam reformer and an auxiliary fuel, whereby the steam reformer, fuel means and burner means are mobile and lightweight.

2. The system according to claim 1, further comprising integrated cooling means for cooling hydrogen collected in the collection header prior to use and simultaneously preheating a combustion air supplied to the burner means.

3. The system according to claim 1, wherein the fuel in the fuel and steam mixture comprises one of automotive gasoline, aviation fuel, alcohol, and hydrocarbon gas.

4. The system according to claim 1, further comprising a desulfurizer connected to the fuel means for desulfurizing sulfur-bearing fuels.

5. A compact, mobile, multi-fuel steam reformer for producing hydrogen, the steam reformer being lightweight having a small volume, the steam reformer comprising:

an outer cylindrical casing;

a cylindrical filtration membrane concentric within the outer cylindrical casing forming a collection annulus with the outer cylindrical casing, the collection annulus being sealed closed at each end and having a hydrogen outlet through the outer casing;

a cylindrical bed wall concentric within the cylindrical filtration membrane and forming a catalyst bed annulus with the filtration membrane and defining a cylindrical flue gas path through the center of the outer casing;

a catalyst bed located in the catalyst bed annulus;

burner means at one end of the outer casing in communication with the catalyst bed and flue gas path for combusting a combustion air and at least one of a reformer process off-gas generated in the catalyst bed and an auxiliary fuel to provide a hot flue gas to the flue gas path;

fuel means at the other end of the outer casing for providing a fuel and steam mixture to the catalyst bed; and exhaust means at the same end as the fuel means for exhausting the hot flue gas from the flue gas path.

6. The steam reformer according to claim 5, wherein the filtration membrane comprises a thin palladium-containing film supported by a substrate.

7. The steam reformer according to claim 5, wherein the catalyst contains at least one Group VIII transition metal supported on a refractory substrate.

8. The steam reformer according to claim 7, wherein the catalyst contains nickel.

9. The steam reformer according to claim 5, wherein the fuel in the fuel and steam mixture comprises one of automotive gasoline, aviation fuel, alcohol, and hydrocarbon gas.

10. A compact, mobile, multi-fuel steam reformer for producing hydrogen, the steam reformer being lightweight and having a small volume, the steam reformer comprising:

a U-shaped outer casing tube having first and second legs connected by an end passage;

an inner U-shaped shell within the U-shaped outer casing tube forming a flue gas annulus therebetween;

burner means at the end passage of the outer casing in communication with the flue gas annulus for combusting a combustion air and at least one of a reformer process off-gas and an auxiliary fuel to provide a hot flue gas to the flue gas annulus;

fuel means at the end of the first leg for providing a fuel and steam mixture;

steam-fuel reformer means in the first leg within the inner U-shaped shell for providing a catalyst to react the fuel and steam mixture to form hydrogen gas; and membrane enhanced reformer means in the second leg within the inner U-shaped shell in communication with the steam-fuel reformer means, the membrane enhanced reformer means for further reacting the fuel and steam mixture and filtering and removing the hydrogen gas from the membrane enhanced reformer means through a hydrogen outlet.

11. The steam reformer according to claim 10, further comprising an outlet and valve means in communication with the first and second legs for controlling the amount of flue gas which exits through the outlet from each of the first and second legs.

12. The steam reformer according to claim 10, wherein the fuel in the fuel and steam mixture comprises one of automotive gasoline, aviation fuel, alcohol, and hydrocarbon gas.

13. The system according to claim 4, wherein the desulfurizer contains a sulfur sorbent comprising a metal oxide.

14. The system according to claim 13, wherein the metal oxide is supported on a substrate comprising one of zeolite, zirconia, and activated carbon.

15. The system according to claim 13, wherein the metal oxide comprises one of zinc oxide and iron oxide.

16. The system according to claim 4, further comprising a sacrificial guard for removing sulfur compounds from the vaporized fuel and steam mixture prior to processing the mixture in the steam reformer.

17. The system according to claim 1, wherein the catalyst contains at least one Group VIII transition metal supported on a refractory substrate.

18. The system according to claim 1, wherein the hydrogen filtration means comprises a thin palladium-containing film supported on a substrate.

19. The system according to claim 1, wherein the steam reformer is of a counterflow design.

20. The system according to claim 1, wherein the steam reformer comprises an inner flue gas passage, a surrounding catalyst bed, and an outer hydrogen collection annulus.

21. The system according to claim 20, wherein the steam reformer comprises plural flue gas passages within the surrounding catalyst bed.

22. The system according to claim 1, wherein the steam reformer comprises plural flue gas passages, each individually provided with its own surrounding catalyst bed and hydrogen filtration means, and a surrounding hydrogen collection area.

23. The system according to claim 1, wherein the steam reformer comprises a plurality of catalyst filled beds which surround their respective hydrogen filtration means and hydrogen collection passageways, located within a single flue gas passage.

24. The system according to claim 1, further comprising fuel cell means for receiving hydrogen produced by the steam reformer.

25. The system according to claim 24, further comprising means for returning water vapor produced by the fuel cell means to the system as make-up water.

26. The system according to claim 25, wherein the means for returning water vapor produced by the fuel cell means to the system as make-up water comprises condenser means.

27. The system according to claim 1, further comprising a turbo expander for depressurizing uncombusted off-gases produced by the steam reformer.

28. The steam reformer according to claim 10, comprising catalyst in the end passage.

29. The steam reformer according to claim 10, comprising catalyst surrounding the membrane enhanced reformer means.

30. The steam reformer according to claim 10, comprising heat transfer fins in at least one of the steam-fuel reformer means and the membrane enhanced reformer means.

* * * * *